Feb. 19, 1935.   R. E. PARIS   1,991,516
SORTING MACHINE
Filed Oct. 31, 1930   12 Sheets-Sheet 1
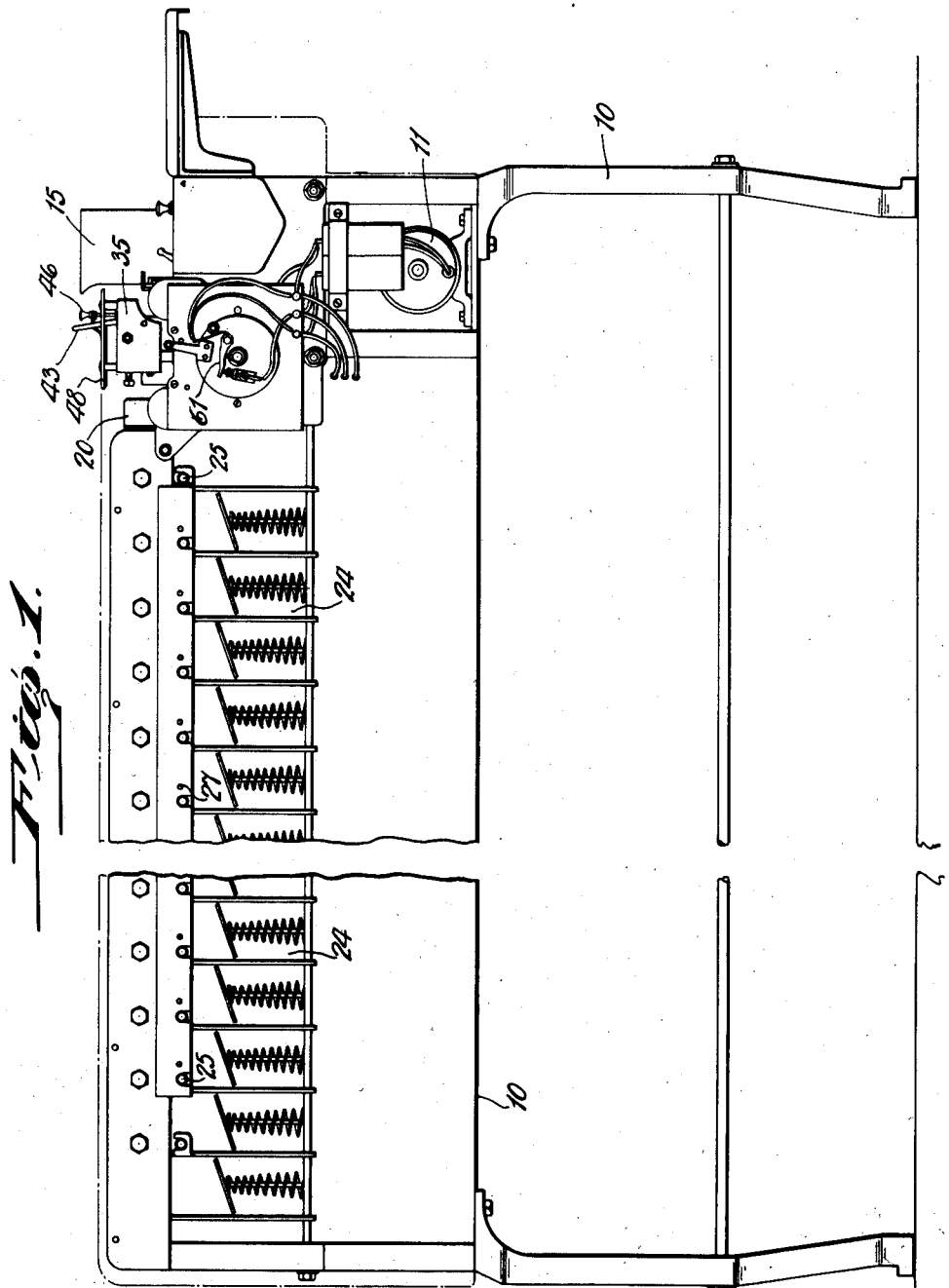

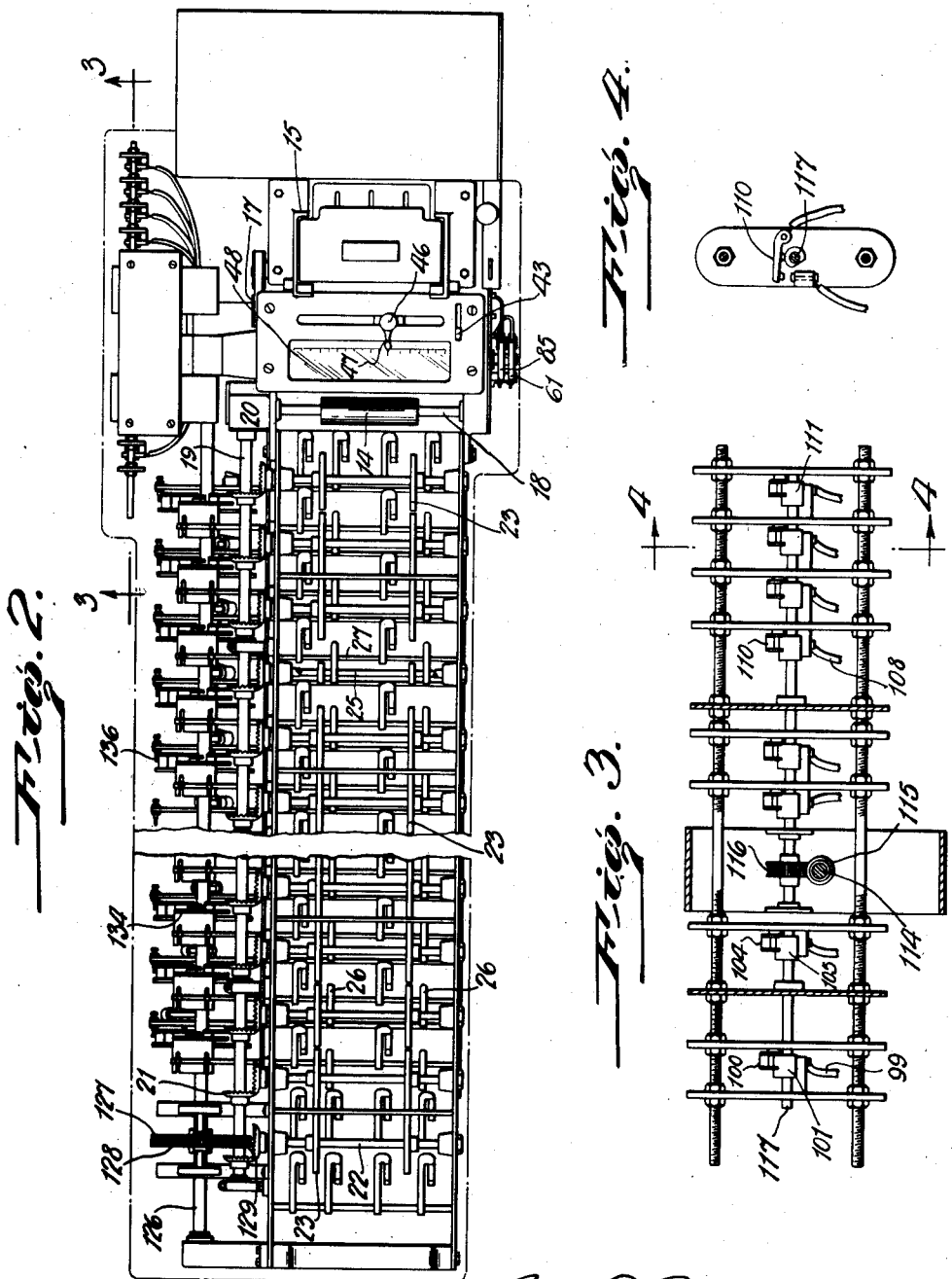

Feb. 19, 1935.  R. E. PARIS  1,991,516
SORTING MACHINE
Filed Oct. 31, 1930     12 Sheets-Sheet 3
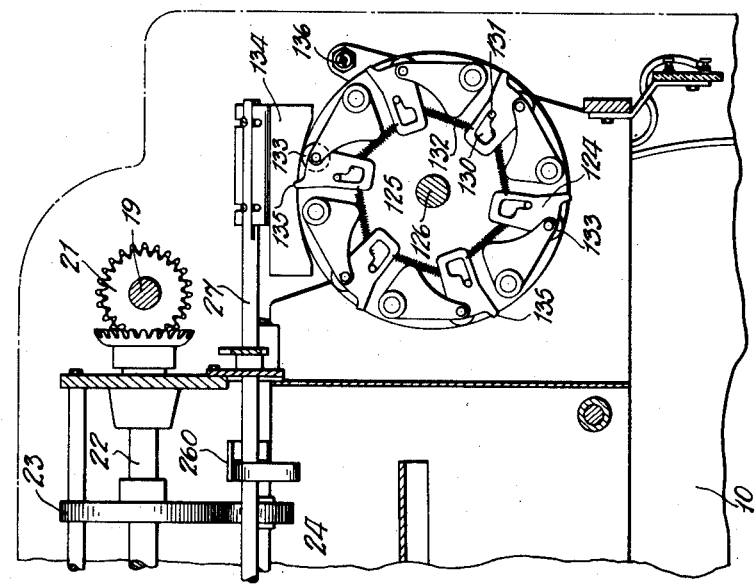
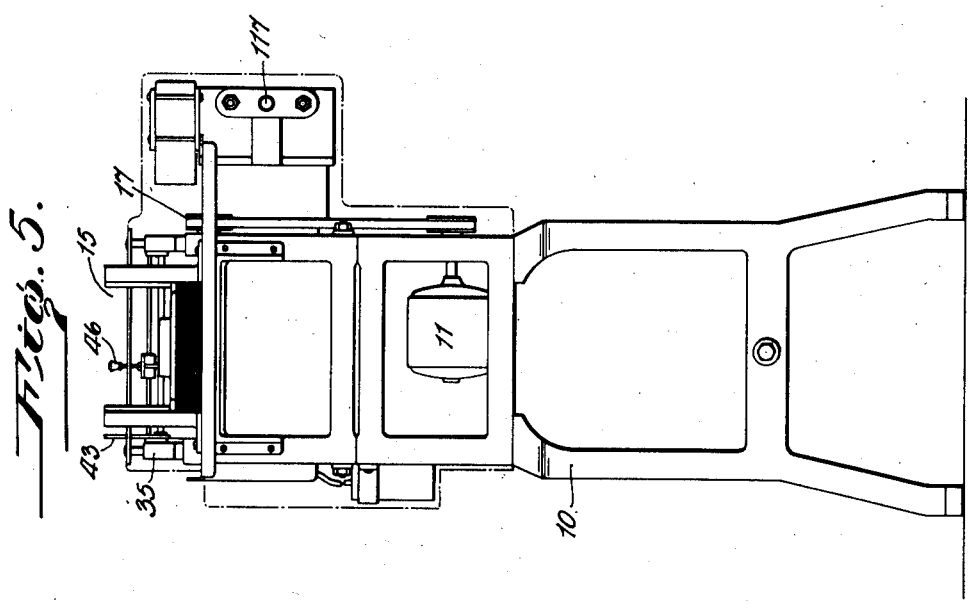
Robert E. Paris Inventor
By his Attorney H. C. Sparks Feb. 19, 1935.  R. E. PARIS  1,991,516
SORTING MACHINE
Filed Oct. 31, 1930   12 Sheets-Sheet 4

Robert E. Paris Inventor
By his Attorney

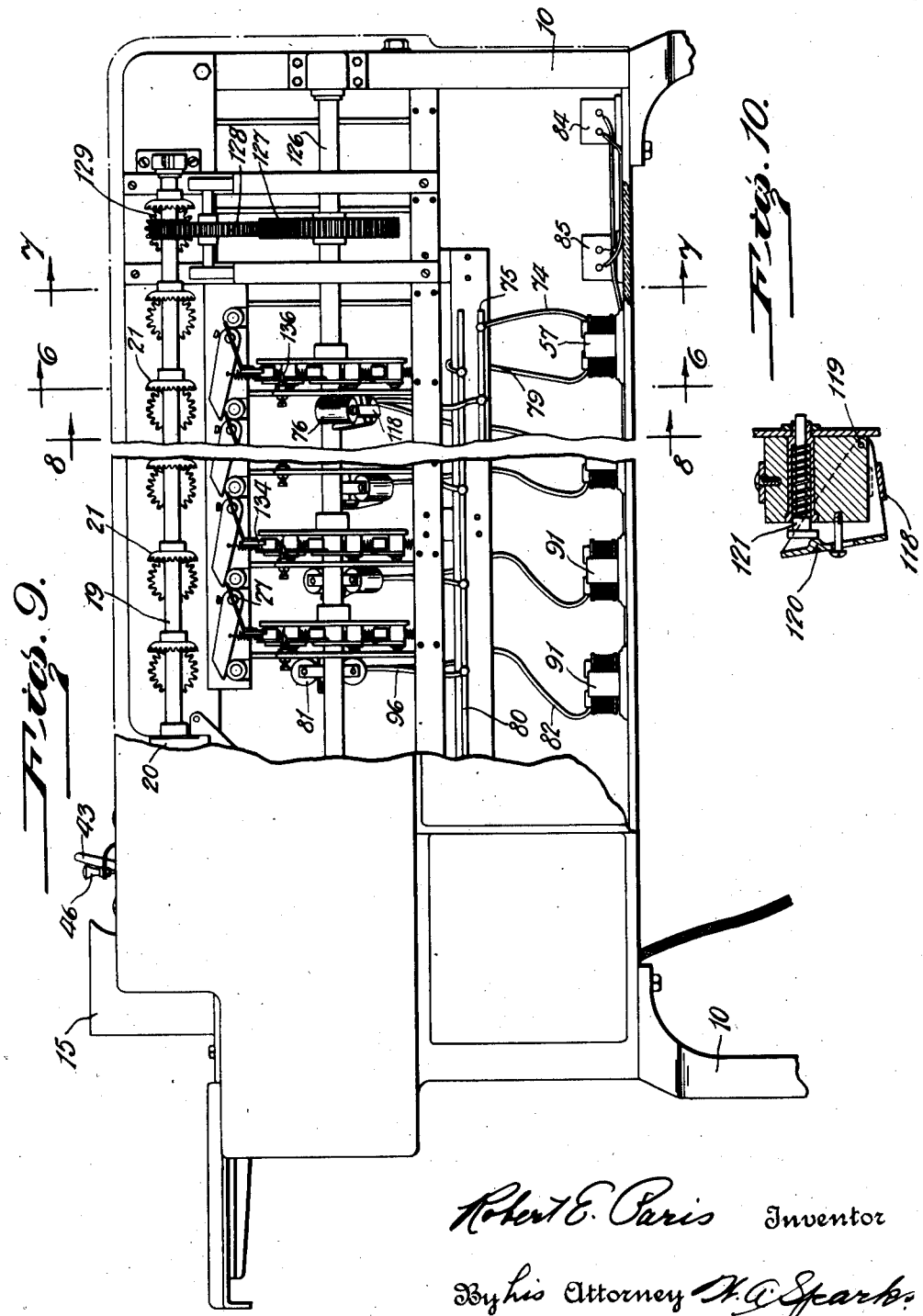

Feb. 19, 1935.  R. E. PARIS  1,991,516
SORTING MACHINE
Filed Oct. 31, 1930  12 Sheets-Sheet 6

Inventor
Robert E. Paris
By his Attorney H. A. Sparks

Feb. 19, 1935. R. E. PARIS 1,991,516
SORTING MACHINE
Filed Oct. 31, 1930 12 Sheets-Sheet 8

Robert E. Paris Inventor
By his Attorney H. A. Sparks

Feb. 19, 1935.  R. E. PARIS  1,991,516
SORTING MACHINE
Filed Oct. 31, 1930   12 Sheets-Sheet 9

Robert E. Paris Inventor
By his Attorney

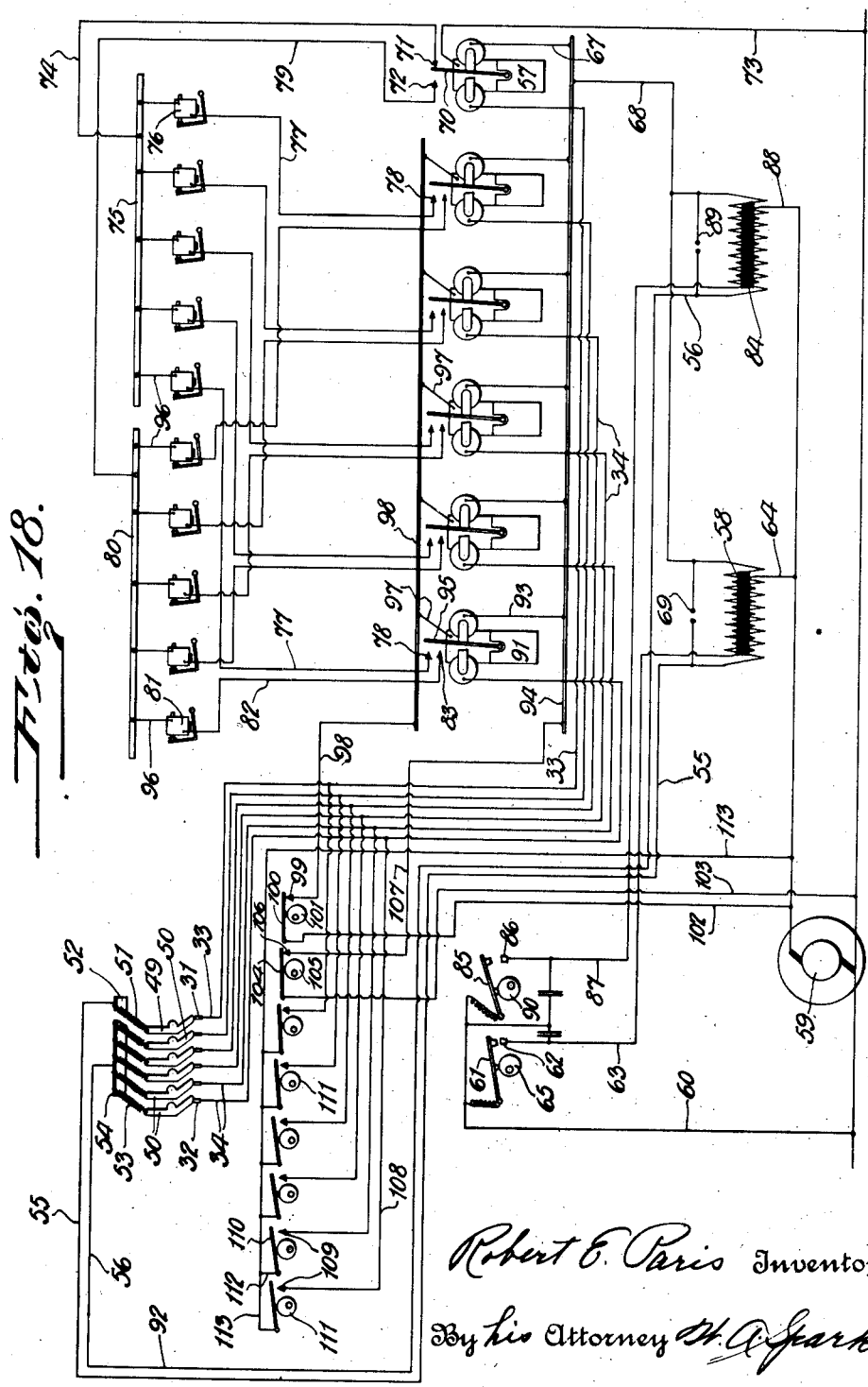

Feb. 19, 1935.  R. E. PARIS  1,991,516
SORTING MACHINE
Filed Oct. 31, 1930   12 Sheets-Sheet 11
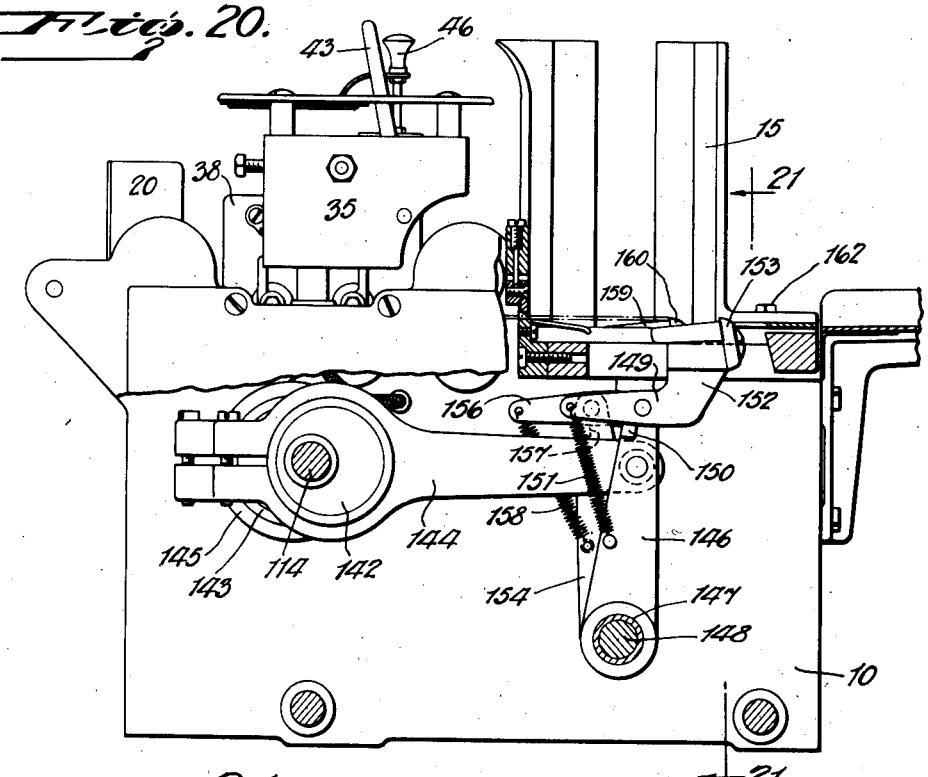
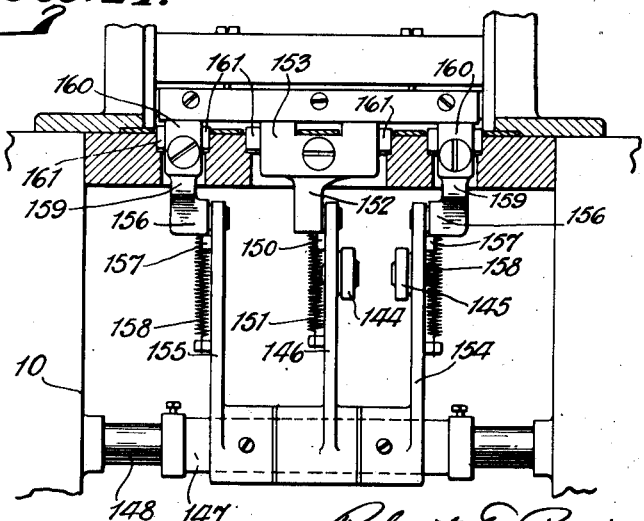
Robert E. Paris Inventor
By his Attorney Feb. 19, 1935.  R. E. PARIS  1,991,516
SORTING MACHINE
Filed Oct. 31, 1930  12 Sheets-Sheet 12

Robert E. Paris  Inventor
By his Attorney

Patented Feb. 19, 1935

1,991,516

UNITED STATES PATENT OFFICE 1,991,516

SORTING MACHINE

Robert E. Paris, New York, N. Y.

Application October 31, 1930, Serial No. 492,523

13 Claims. (Cl. 209—110)

This invention relates to record sensing machines and particularly to machines for effecting sensing by means of a high tension electrical discharge. While the invention is shown embodied in a sorting machine of the general Powers type, it is to be understood that many of the features are applicable to punch-card tabulators and to tabulators, sorters and kindred machines of the Hollerith and other types.

Generally speaking the invention consists of certain instrumentalities for utilizing high-tension current as a means for controlling sorting or kindred mechanism and is in some respects an extension of the inventive thought set forth in my pending application Ser. No. 380,687, filed July 24, 1930, now Patent No. 1,916,232.

The principal objects of the invention are to increase speed, simplify operation, sense "on the fly" in a Powers type machine, increase capacity of a record card, and other objects which will appear from the following description and appended claims. It may be stated that these objects have been attained in a full size operating machine, which reduction to practice developed a speed of one thousand cards per minute, but on account of the inherent difficulties of the Powers picker block, the speed was reduced to eight hundred so as to avoid the danger of throwing the picker block out of the machine. The highest speed at which sensing could be accurately made and translated into work, has not yet been determined.

All of these objects are attained by means, one form of which is shown in the accompanying drawings in which:

Fig. 1 is a fragmentary left side elevation of a Powers type sorter embodying my invention.

Fig. 2 is a top plan view of the same.

Fig. 3 is a fragmentary detail view taken substantially on line 3—3 of Fig. 2.

Fig. 4 is a detail sectional view taken substantially on line 4—4 of Fig. 3.

Fig. 5 is a front end elevation of the machine.

Figure 7:
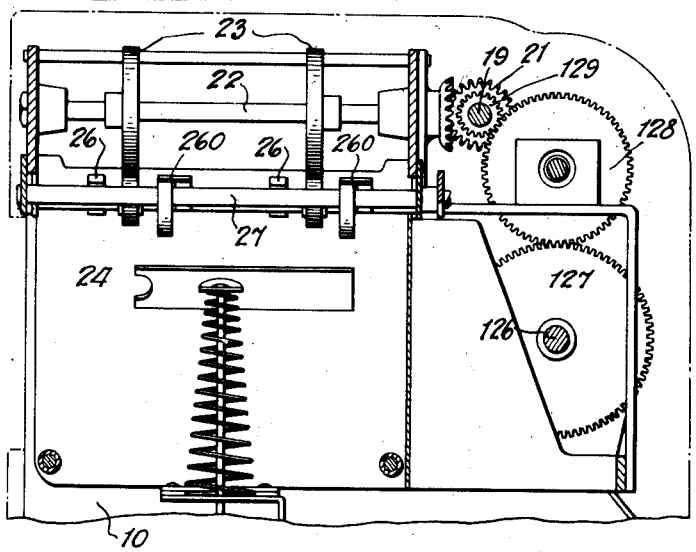
Figure 8:
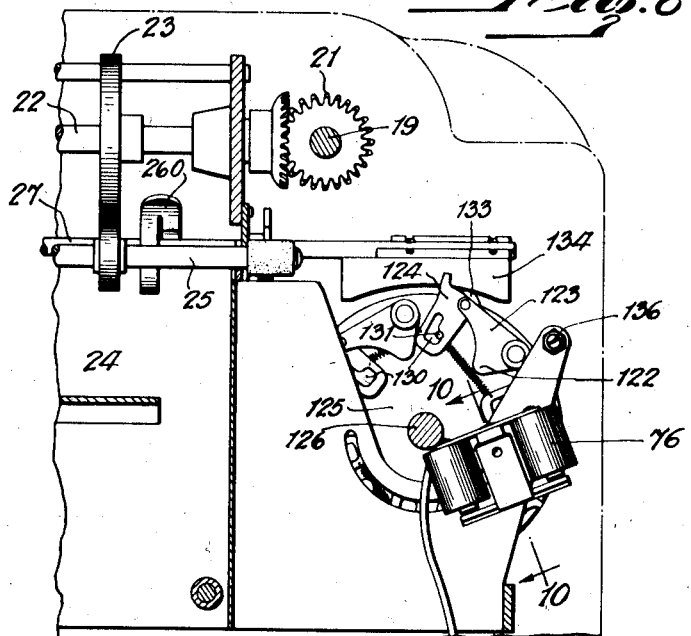

Figs. 6, 7 and 8 are fragmentary detail views taken, respectively, substantially on lines 6—6, 7—7, and 8—8 of Fig. 9.

Fig. 9 is a fragmentary right side elevation, parts being broken away for the sake of clearness.

Fig. 10 is a detail sectional view taken substantially on line 10—10 of Fig. 8.

Figure 11:
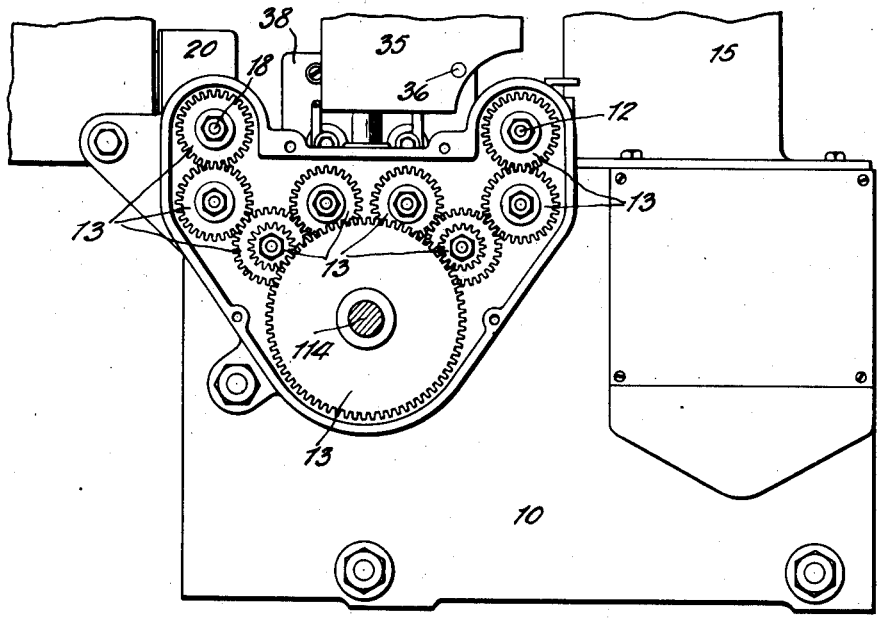

Fig. 11 is an enlarged side elevation of the card feed and driving mechanism.

Figure 12:
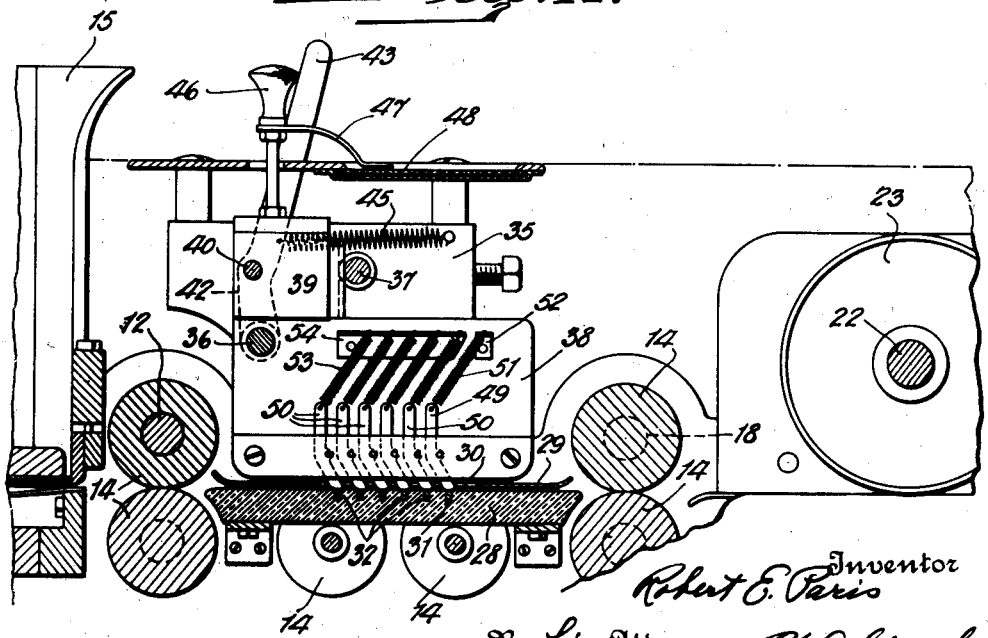

Fig. 12 is a fragmentary vertical sectional view, taken thru the sensing field and card magazine, and looking toward the left hand side of the machine.

Figure 13:
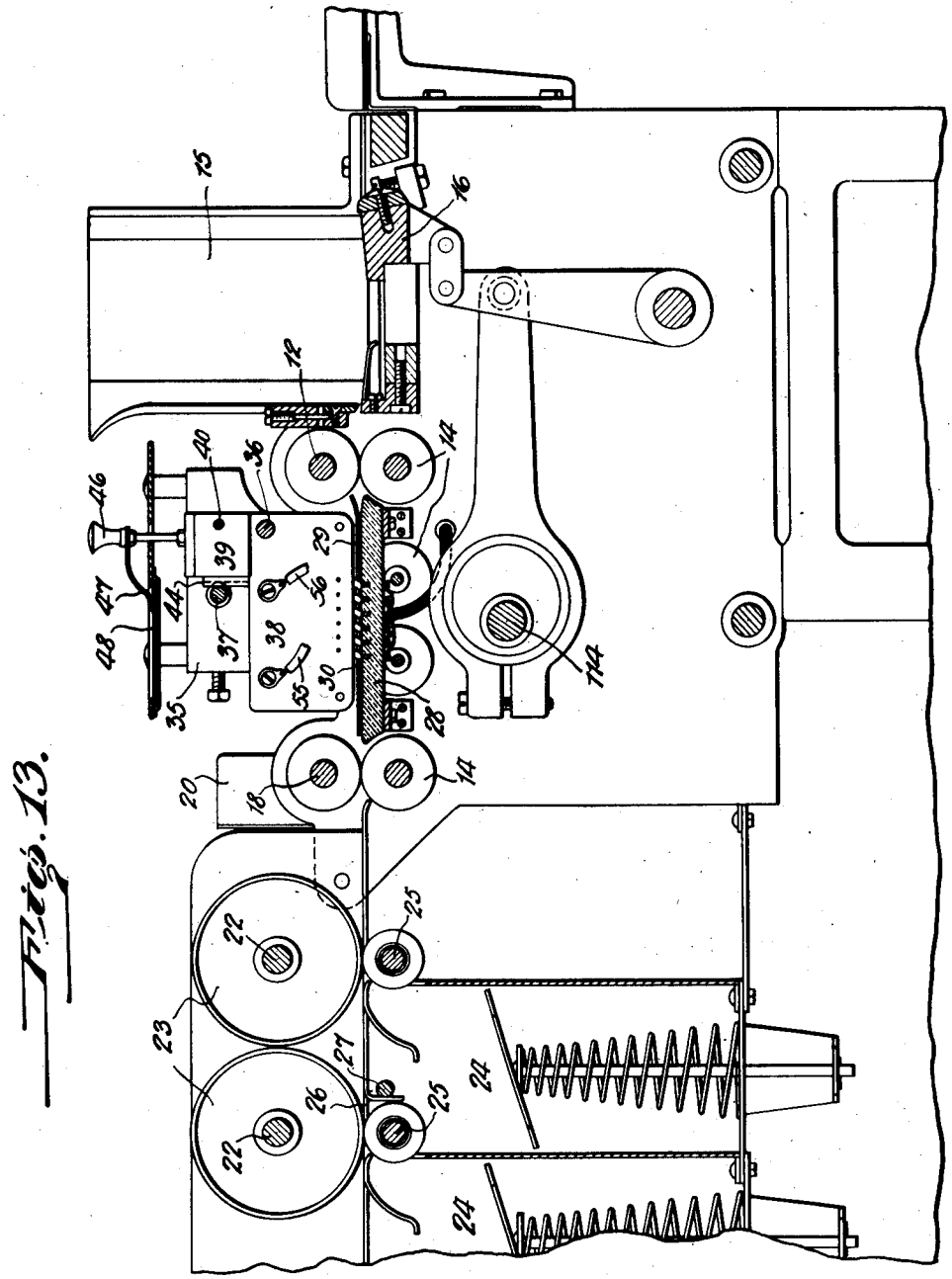

Fig. 13 is a similar view looking toward the right hand side of the machine.

Figure 14:
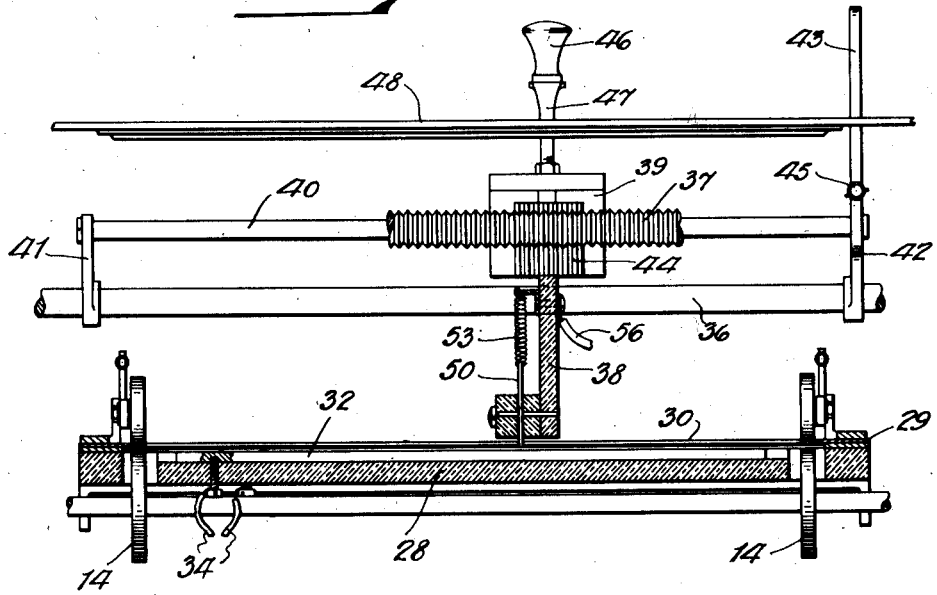

Fig. 14 is a detail view showing the means for setting the sensing device for various columns on the card.

Figure 15:
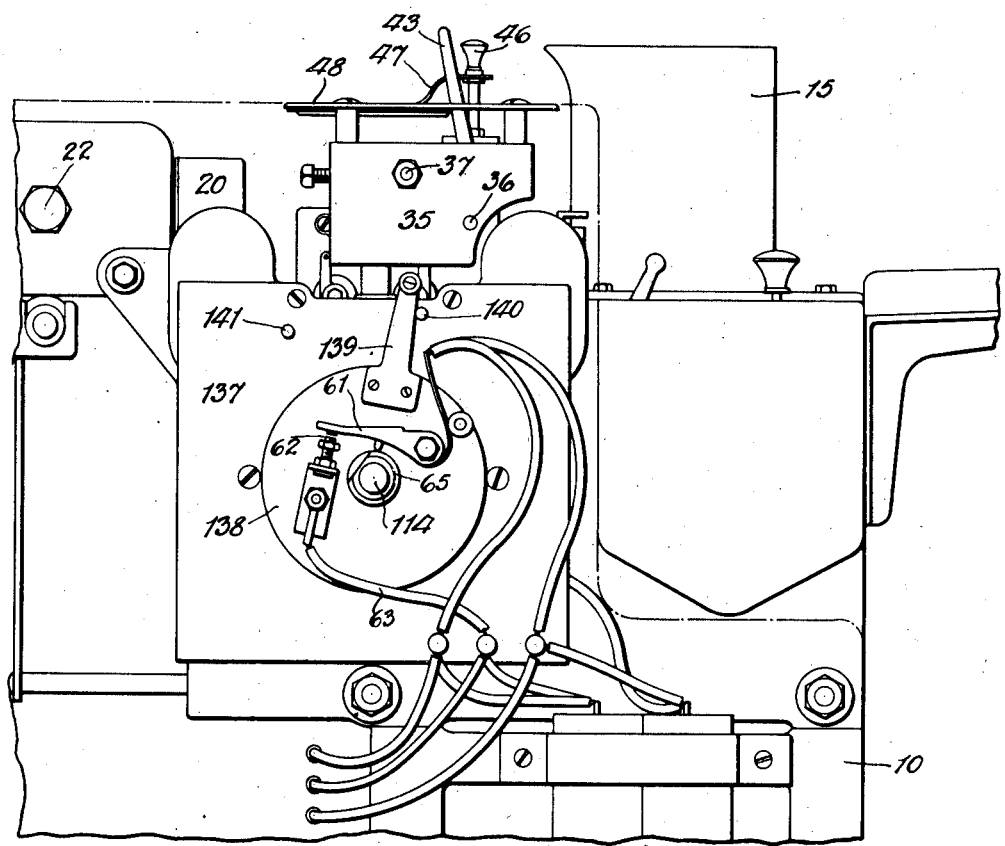

Fig. 15 is an enlarged fragmentary left side elevation of the sensing end of the machine.

Figures 16, 17:
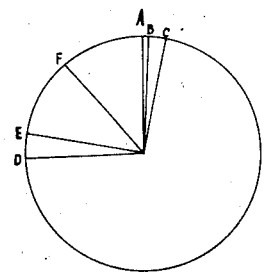

Fig. 16 is a view showing a fragment of one form of record.

Fig. 17 is a timing diagram.

Fig. 18 is a wiring diagram representing graphically the several electric circuits and associated parts.

Figure 19:
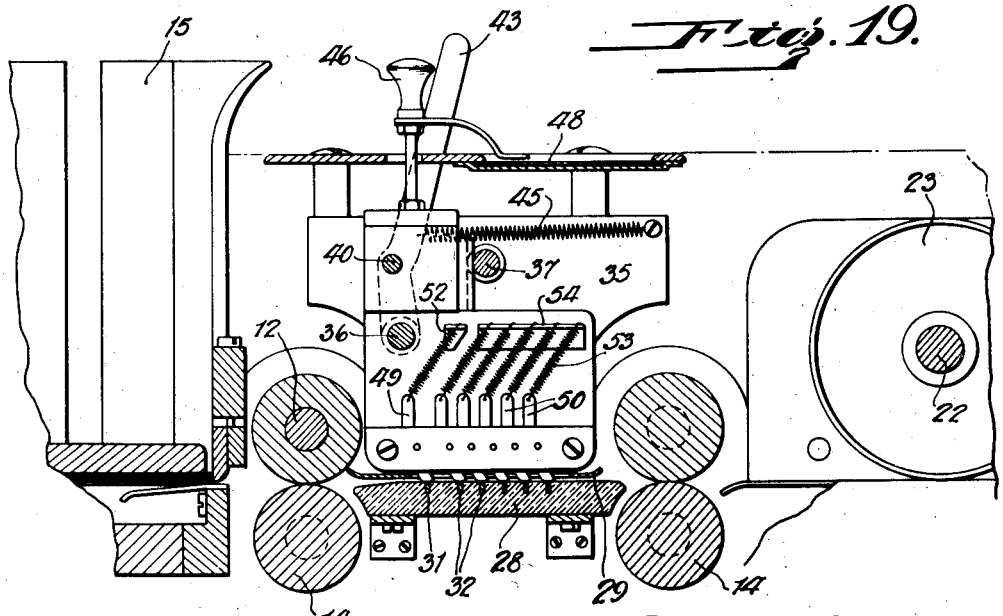

Fig. 19 is a fragmentary front to rear section similar to Fig. 12 but of a modified form of the invention.

Fig. 20 is a view similar to Fig. 13 but of a modified form of feed.

Fig. 21 is a view substantially on line 21—21 of Fig. 20.

Figure 22:
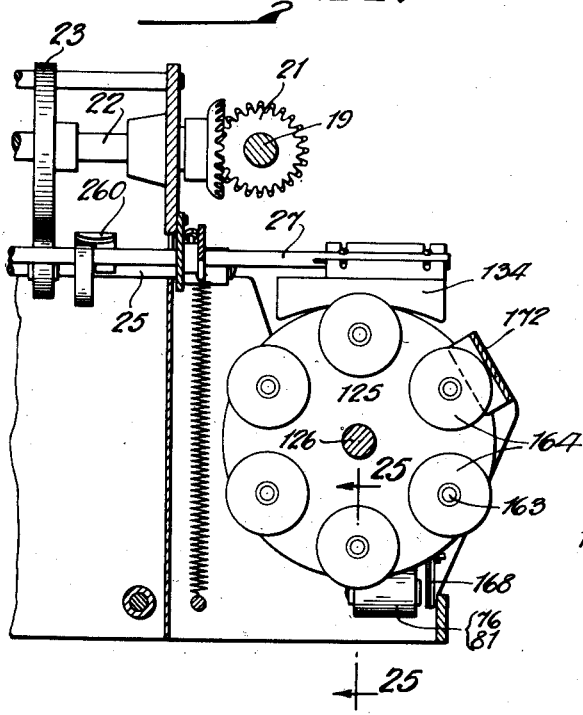

Fig. 22 is a view similar to Fig. 6 but of a modified form of presetting mechanism.

Figure 23:
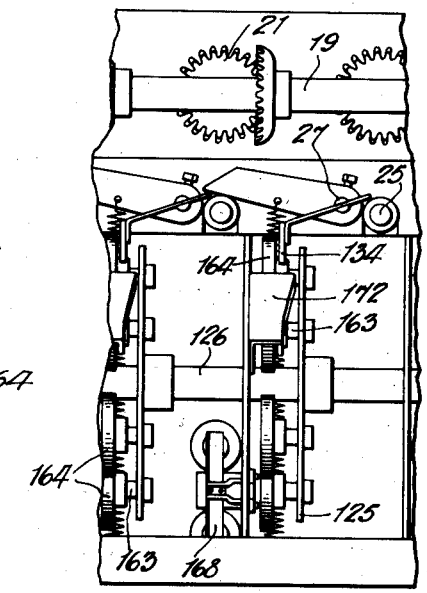

Fig. 23 is a view of the same looking toward the left.

Figure 24:
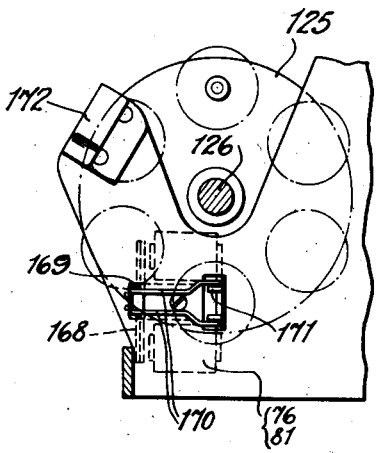

Fig. 24 is a view of parts shown in Fig. 22 but looking in the opposite direction.

Figure 25:
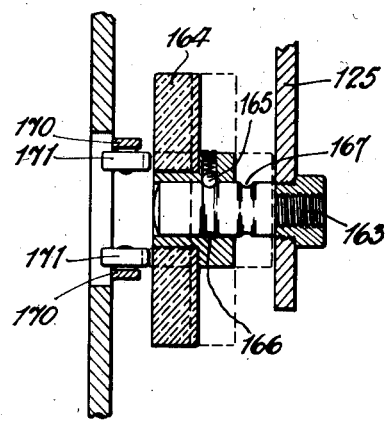

Fig. 25 is a view substantially on line 25—25 of Fig. 22.

The characters of reference refer to like parts in all views.

Referring to the drawings in detail, 10 represents the general framework of a sorting machine of the Powers type as specifically shown and described in the patent to Lasker, 1,476,161, issued December 4, 1923. Such a machine is provided with a motor 11 which drives a main shaft 12. This main shaft 12 drives a train of gears indicated collectively at 13 in Fig. 11, which train of gears run a plurality of card feeding rollers 14, Fig. 12. A card magazine is shown at 15 and a reciprocatory card picker at 16, Fig. 13. The right hand end of shaft 12 carries a pulley 17, Fig. 2, which is driven from the motor 11.

The train of gears 13 effect driving of a shaft 18, Figs. 2 and 11, which drives the shaft 19 in the usual manner,—i. e., by a worm and worm-gear not shown but housed within a gear box indicated at 20. Shaft 19 carries a plurality of crown gears 21 which operate respective shafts 22 carrying card feed rolls 23. Thus by the means thus far described, and which are all old and well known, cards or records are passed from the magazine 15 along a path over a plurality of card boxes or record receiving stations 24.

The upper ends of the receiving stations are normally closed by guide strips of metal of which there are four at each station. In the ordinary Powers construction, the strips for any box are all mounted on a shaft 25 arranged at that box, and are moved by the shaft from normal to deflecting position. In the present construction, however two of these guide strips at each box and indicated at 26, Figs. 2, 7 and 13, have their front ends cut away and are mounted on shaft 25 but such shaft is never rocked, and consequently strips 26 now serve merely to form part of the path along which the records are passed. The other two strips 260 for each box are made in substantially the same form as in the usual Powers construction, but are secured to a shaft 27 which is rocked to open the card box and deflect the record into the station under the control of sensing and setting means presently to be set forth.

The sensing head

In the ordinary Powers construction, the sening head includes a die plate onto which the record is fed and momentarily held stationary while a field of pins is brought down onto the record. If a pin passes thru an aperture in the record, it operates a Bowden wire to set the box opening devices. In the present instance, however, the card or record is not stopped for sensing, nor is anything moved down so as to pass thru the card. The sensing is done by passing of an electrical discharge thru the data punctures or slices in the record. The sensing differs from the Powers sensing in that it is electrical, and from the Hollerith type of sensing in that a brush does not pass thru an aperture to make mechanical contact, but electricity itself is all that passes through the card. With this system of sensing, very minute punctures or slices in the record may be utilized to indicate the data so that the record remains substantially intact and may be written on by any suitable instrumentality. It also permits bringing the data columns closer together on the record card so as to increase the capacity of the card.

The sensing head as shown in Figs. 1, 2, 5, 11 to 15, includes a plate 28 suitably supported from the framework 10 and formed of insulating material. Above the plate or block 28 is a guide plate 29 which is cut away in the center as at 30 so as to permit free movement of the electrodes of the movable portion of the sensing head.

It may be well at this point to mention that the present machine is shown as operating by "combinational perforations," altho of course it could operate by individual perforations by providing the desired number of elements. Combinational punctures are preferable, however, as they increase the capacity of the record card and decrease the number of parts necessary. The combination used, as indicated on the specimen record shown in Fig. 16, requires six puncture positions, one selecting the group and the other five selecting the particular unit of the selected group.

Embedded in the plate or block 28 so as to have their upper edges flush with the upper surface thereof are six bars of electrical conducting material, one of which is indicated at 31 and the other five at 32.

These six bars extend across the entire record zone of the card or record path, and each is connected to one end of a wire or lead, that for bar 31 being indicated at 33 in Fig. 18, while the respective leads for the several bars 32 are indicated at 34 in that figure. Secured to the framework 10 of the machine are upright side pieces 35, which carry a pivot shaft 36 and a carriage location rod 37. The location rod 37 is formed with a plurality of annular serrations which are arranged the same distance apart as the distance between columns on the record card. Slidably mounted on the rod 36 is a carriage 38 formed of insulating material and broadened at 39 to form a bearing for a rod 40 which passes through the portion 39 of the carriage and is supported at opposite ends by arms 41 and 42, the latter of which is extended upwardly into a finger piece 43. Carried by the portion 39 of the carriage is a serrated block 44, the serrations of which are adapted to enter those of the shaft 37 and thereby lock the carriage in any desired position. A spring 45 tends constantly to draw arm 42 so as to bring the element 44 into engagement with the rod 37. A rod extends upwardly from the carriage and is provided with finger pieces 46 and with a pointer 47 which traverses an indicator scale 48 so as to indicate the column of the card which is being utilized for sorting purposes. By drawing forwardly on the finger piece 43 the element 44 is disengaged from the rod 37 and the carriage may then be moved by the finger piece 46 to any desired column, such column being indicated by the relationship of the elements 47 and 48. Upon releasing the finger piece 43 elements 39 and 37 are again engaged. Pivotally mounted in the lower part of the carriage 38 are six electrodes, one of which is indicated at 49 in Fig. 12 and the other five of which are indicated at 50 in the same figure. The electrode 49 is connected by a spring 51 to a metallic member 52 and all of the electrodes 50 are connected by springs 53 to a common metallic piece 54. Members 52 and 54 are supported by the carriage 38 but in spaced relation to each other. Member 52 is connected to a lead 55 and member 54 is connected to a lead 56 as seen in Fig. 18.

It will be seen that the springs 51 and 53 tend constantly to force the metal ends of the electrodes 49 and 50 towards the bars 31 and 32, and that when a card or record is passing thru the throat formed between members 28 and 29, the electrodes 49 and 50 are thereby supported and spaced apart from the members 31 and 32. If at this time a puncture registers with one of the electrodes and one of the bars, and a break is made in the primary of a spark coil connected to that electrode, an electrical discharge will take place thru the puncture. The means for effecting the electrical discharge in proper timed relation to the movement of the card will now be described.

In a machine as shown in the drawings the electrodes are shown as evenly spaced apart, and consequently punctures on the sheet must be arranged so that those which coact with the electrodes 50 will be equi-spaced whereas a puncture coacting with electrode 49 will be spaced apart from the next adjacent puncture a distance somewhat greater than the distance between the punctures cooperative with electrodes 50. By reference to Fig. 16 the several puncture positions will be readily understood. The purpose of this arrangement is so that the puncture for electrode 49 may first come into cooperative relationship with said electrode and thereby select a group of magnets, and thereafter the puncture for any of the electrodes 50 may come into effective position so as to select the respective magnet of the selected group. In all probability, in manufacturing the machine the electrode 49 would be placed as shown in Fig. 19, at the other end of the series of electrodes and would be spaced apart a different distance from the spacing between the electrodes 50, so that all puncture positions would be equi-spaced. In either case the result is the same although mechanical expediency might suggest the latter method. The embodiment as shown is, however, precisely that of the reduction to practice, already effected.

When a record card is advanced so as to bring a puncture into operative relationship with electrode 49, a spark jumps the gap between the lower end of electrode 49 and the associated bar 31, thereby setting a polarized relay 57, for grounding one or the other of two sets of magnets as will presently be set forth. The spark is caused by the breaking of the primary circuit of a spark coil 58, Fig. 18. This primary circuit includes a motor generator or similar source of power 59, a lead 60 secured to a contactor 61 which may engage a contact 62 secured to a lead 63 passing to the spark coil 58 and the circuit is completed by a lead 64. The contactor 61 is operable by a rotary cam or other make-and-break device indicated at 65, for effecting a break in the primary at the precise instant when a puncture will be in cooperative relationship to elements 49 and 31, if such a puncture forms part of the record being analyzed. The secondary circuit of spark coil 58 passes from said spark coil over lead 55 to the element 52, thence over spring 51, electrode 49, the spark gap between 49 and 31, lead 33, to one side of relay 57, thence over lead 67, connected to a lead 68 passing directly to the opposite side of the spark coil 58. An auxiliary spark gap is indicated at 69, the purpose of this spark gap being to prevent the jumping of a spark to an aperture in an adjacent column or to an aperture preceding or following the position of the aperture where the spark should jump, in cases where no aperture occurs in this particular position. For instance, if there is no aperture to correspond with elements 49 and 31 in the column being analyzed, then when the aperture position of this column reaches the electrode 49 it is necessary to provide a by-pass for the spark, as otherwise, it might jump through the aperture provided in an adjacent column or in the same column but preceding or following the required aperture position. The distance between electrodes of the auxiliary spark gap is less than the distance between columns or positions but greater than the working gap. When the relay 57 is actuated by the spark jumping from electrode 49 to 31 its armature 70 which normally engages a contact 71 is moved into engagement with a contact 72. If there is no aperture in the column being analyzed to coact with elements 49 and 31 then armature 70 will remain in engagement with contact 71, and will close a circuit from the motor generator 59 through a lead 73 and through the armature 70 and contact 71 to a lead 74 connected with a common bus 75 for five magnets 76, each of which has its other side connected by a respective lead 77, to a contact 78. When, however, the relay 57 has been set so that armature 70 has passed from engagement with contact 71 into engagement with contact 72, then the circuit is completed from the motor generator 59 through lead 73, armature 70, contact 72 to a lead 79, passing to bus bar 80 of five magnets 81 each of which is connected by a lead 82 to a contact 83.

It will now be seen that the contacts 78 and 83 are arranged in five pairs, each pair comprising one contact 83 and one contact 78. After the card has had an opportunity to operate the magnet 57 so as to determine or select one or the other of the sets of magnets 76, or 81, the puncture positions cooperative with the electrodes 50 and bars 32 then come into cooperative relation with the several electrodes simultaneously, but it will, of course, be understood that in any one column there will be only one puncture cooperating with an electrode 50. At the instant when this puncture comes opposite the respective electrode 50 a spark or high tension electric discharge passes from such electrode through the puncture to the respective bar 32. This spark is occasioned by the breaking of the primary circuit of a spark coil 84. The primary circuit of a spark coil 84 includes elements 59 and 60, the latter passing also to a contactor 85 adapted to engage a contact 86 connected by a lead 87 running to the spark coil 84, said circuit being completed by a lead 88. An auxiliary spark gap 89 is shown having the same purpose as hereinbefore described in connection with spark gap 69. The contactor 85 is adapted to be disengaged from contact 86 by means of a cam or other suitable make-and-break device 90, at the precise instant that the several datum positions come between the electrodes 50 and bars 32, and the high tension current passing over one of the several leads 34 effects operation of a respective one of the five relays 91. The circuit for operating each of these relays passes from one side of the spark coil 84 over lead 56 to the metallic member 54 thence over the respective spring 53 and its electrode 50 across the gap to the respective bar 32 and thence over a connected lead 34 to one side of the respective relay 91, thence over a lead 93 to a bus bar 94 which connects to the common return 68 of the spark coils. Each of the relays 91 is provided with an armature 95 which normally stands disengaged from a respective pair of contacts 78 and 83 but when a relay 91 is energized by the passing of the high-tension current through its electrode 50 and bar 32 the armature is drawn over until it engages with the respective contacts 78 and 83. As to whether the respective lead 77 or 82 is rendered "live" depends upon whether the armature 70 is in engagement with the contact 71 or the contact 72 as above described.

Each of the magnets 81 is provided with means for setting a deflector operating device in such timed relation as to cause the operation of the proper deflector shaft 27 at the proper time to deflect the record anaylzed into the respective station. The circuit for operating each one of the magnets 81 includes the connections from the motor generator 59 to and including the respective lead 75 or 80 thence over an individual lead 96 to the respective magnet 81 or 76 and over a lead 82 or 77 from the opposite side of such magnet to the contact 83 or 78 as the case may be, thence over armature 95 and connection 97 to a common lead 98 passing to a contact 99 adapted to be engaged by a contactor 100 which is movable by a cam or other make-and-break device 101 in such timed relation as to close the circuit from 99 to 100 at the time that the magnet 81 or 77 should be operated. The contactor 100 is connected by a lead 102 back to the generator.

After the respective magnet 76 or 81 has been operated to set the deflector operating mechanism, it is necessary to reset the polarized relays 57 and 91 to their normal position ready for operating in accordance with the next record introduced into the machine by the feeding device. For this purpose current (but this time, low-tension current) is passed through the relays 57 and 91 in the reverse direction to that already described, by means as follows: A lead 103 from the positive side of the motor generator is connected to a contactor 104 which is operable by a cam or other suitable device 105 to effect engagement with or disengagement from a contact 106, such engagement being effected at the time when it is desired to reset the several relays 57 and 91. Current passing over lead 103 and contactor 104 to contact 106 is conducted by lead 107 to a member 94 which it will be recalled is common to all of the magnets 57 and 91. From member 94 current is conducted by leads 67 and 93 to the respective magnets 57 or 91 as the case may be and thence over leads 34 to connected leads 108 each of which leads terminates in a contact 109, adapted to be engaged by a contactor 110 operable by a cam or other suitable device 111. The members 111 and 105 are of such construction as to effect simultaneous closing of all of the circuits by the contactors 110 and 104 so that electric current passes through each of the relays 57 and 91 drawing the armatures thereof to normal position. The several contacts 110 are connected by leads 112 to a common return 113.

The contactor operating members 65 and 90 are mounted on a shaft 114, Figs. 1, 3, 2, 4 and 5 which shaft is driven from gear 13, Fig. 11, and is provided with a worm 115 which drives a worm gear 116 thereby driving a shaft 117 upon which the several contact operators 101, 105, 111, are secured. In this way the several circuits are positively completed or broken, when necessary, in timed relationship to the travel of the record through the sensing means, and in proper timed relationship to each other.

I shall now describe the mechanism operable by each of the magnets 76 and 81 for setting devices to operate the deflectors in proper timed relationship with the movement of the card or record so that the latter may be deflected into its proper receiving station.

Referring now particularly to Figs. 5 to 10 inclusively, it will be seen that each magnet 76 or 81 is provided with an armature 118 pivoted to swing about the center 119 and formed with a lug 120 which normally engages the head of a spring pressed pin 121 mounted in the support of the magnet. The other end of pin 121 when extended by the rocking of armature 118 upon energizing of a magnet, extends into the path of rounded shoulders 122 of rock members 123 to which are pivotally secured setting members 124. The several rockers 123 at each station are mounted on a single disk or plate 125 as in the said Lasker patent, all of such plates 125 being mounted on and rotated by a common shaft 126. This common shaft 126 is driven by shaft 114 by a worm and gear not shown. In the present instance, the shaft 126 has secured to it a gear 127 which meshes with an idler gear 128 which in turn meshes with a pinion 129 mounted on and driving shaft 19.

Each setting dog 124 is formed with a bayonet slot 130 and normally the outer leg of this slot embraces a pin 131 on the disk 125 and is held in such engagement by a spring 132. When a pin 121 is pushed into the path of elements 122, it engages the nearest advancing element 122 thereby rocking that member 123 and its setting dog 124 until pin 131 is opposite the lower leg of the slot 130 of the dog 124, whereupon the latter is moved clockwise as viewed in Fig. 6 and locked in set position.

Mounted on the pivotal connection between each rocker 123 and dog 124 is a roller 133 which, when the dog 124 is set, extends into the path of a deflector cam plate 134 secured to the deflector shaft 27 of that station.

Attention is particularly directed to the fact that the cam plate 134 of the present invention has been made to control the entire deflector movement and that there is no sudden dropping of the deflectors, so that the noise of the machine has been greatly reduced. The several magnets 76 and 81 are disposed in such relationship to the respective plates 125 that when a pin 121 is moved to effect a setting of one of the rollers 133 into effective position, such roller will not arrive at and operate plate 134 until the respective card or record has been moved along the path of travel to a position such that it will be deflected into its proper station by the operation of the member 134 and its shaft 27. Each setting dog 124 is formed with a return finger 135 which after the roller 133 has operated the cam plate 134, contacts a stationary stud 136 thereby forcing the dog 124 about its pivot until it is unlocked at which time the combined effect of 136 and spring 132 causes the members 123 and 124 to return to their normal condition.

In Fig. 17, there is diagrammatically illustrated the timing of the several operations during a card cycle,—i. e. during the time from the instant when one card is in position for the "ground spark" to occur to the instant when the next succeeding card is in the same position. Presuming, then, that a card cycle starts with the instant of effecting a "ground spark" and representing this at A, then B represents the instant of the number spark, C the instant of the turning on of number magnet current, D the instant of turning such current off, E the instant of turning on the relay-reset current and F the instant of turning off the relay-reset current; when the cycle proceeds back to A, the next card is in position for the "ground spark".

In order to advance or retard the spark caused by the breaking of the circuit through elements 61 and 62, and 85 and 86, there is rotatably mounted on the end plate 137, Fig. 15, which is made of insulating material, a disk 138 also of insulating material. The disk 138 is rotatably supported by 137 in any suitable way as, for instance, by flanges extending on either side of 137. The plate 138 carries the contacts 62 and 86 and the contacts 61 and 85 and is provided with a handle 139, the movement of which is limited by stop pins 140 and 141. By moving the handle 139 between the stop pins 140 and 141 to any required position, the spark may be advanced or retarded. Disk 138 may be held in adjusted position either by flanges or other locking means (not shown). By this means the machine may be adjusted to sense from different datum zones on the record.

In Fig. 19 there is shown a modification of the invention in which the members 28 and 29 have been shortened so as to eliminate the two central feed rollers shown in Fig. 12 and which are commonly known in the art as the skid-rollers; and the electrodes 49 and 50 have been shown in differently spaced relationship. In this Fig. 19 the electrode 49 is spaced apart from the next adjacent electrode 50 a distance greater than the distance between any two adjacent electrodes 50, whereby a card may be utilized in which the puncture positions are all equi-spaced.

In Figs. 20 and 21 there is shown a modified form of feed. For high speeds such as one thousand or over cards per minute, the usual Powers feed shown in Fig. 13 is not the most desirable as it wracks the machine and was not designed for such rapid reciprocation of the picker block.

As shown in Figs. 20 and 21, there are two eccentrics 142 and 143 provided with respective eccentric straps 144 and 145. The front end of member 144 is pivotally connected to an arm 146 oscillating on a sleeve 147 free on the known stationary rod or shaft 148 supported by the machine frame.

Pivoted to the upper end of rock arm 146 is a lever 149 normally held down against a stop lug 150 on arm 146 by a spring 151. At its front end, lever 149 is formed with a short picker block 152 carrying a picker knife 153.

The strap 145 is pivotally connected at its front end to a rock arm 154 secured to one end of sleeve 147. The other end of sleeve 147 carries a similar rock arm 155. Each rock arm 154, 155 carries a respective lever 156 normally held against a respective stop lug 157 by a respective spring 158. Each lever 156 has its front end formed into a picker block 159 carrying a respective picker blade 160.

The eccentrics 142 and 143 are set diametrically opposite so that when knife 153 is operated to force a card thru the throat of the card magazine 15, the knives 160 are being returned to position for picking the next card. As the knives 153 or 160 pass forwardly under the card being advanced by the other knife, the respective lever or levers 149, 156 are rocked slightly against the tension of their springs, such rocking being enforced by the weight which is always put on the card stack in magazine 15 as well known in the art. The edges of blocks 159 and 152 are guided by elements 161 which travel in ways in the bed plate, and normally are held up slightly as indicated in Figs. 20 and 21 by the springs, so that just enough rocking is permitted to return the blades properly to card picking position without stripping the advancing card from the other picker.

Thus with eight-hundred revolutions per minute of shaft 114 there could be fed sixteen-hundred cards without placing a breaking load on the general Powers type of sorter.

In Fig. 20 the card magazine 15 is shown as constructed of four adjustable corners which can be adjusted relatively to each other by any suitable device such as bolts 162, to provide for different sizes of cards.

In the modification shown in Figs. 22-25, the disks 125 carry studs 163 upon which are adjustably mounted rollers 164. The hub of each roller 164 is provided with a spring-pressed ball 165 which may be seated in groove 166. When the ball 165 is seated in groove 166 the respective roller 164 is out of alignment with the cooperative member 134; and when ball 165 is in groove 167, the respective roller 164 is in alignment with the cooperative member 134.

In Fig. 24, the magnets are again illustrated at 76, 81, and each is provided with an armature 168 pivoted at 169 and formed with legs 170 carrying anti-friction rolls 171 which, when the magnet is energized are adapted to contact one of the rolls 164 and set it from the position shown in full line in Fig. 25 to the dotted-line position. As the roller thus set is carried forward it trips the respective member 134 and is thereafter returned to normal by a cam 172. This construction would eliminate a very large part of the objectionable noise of the Powers type sorter.

While the invention has been shown as applied to a Powers type sorter, it is obvious that it might be equally well applied to a Hollerith type sorter, and while the invention is shown particularly on a sorter, many of the features are equally applicable to tabulators of various makes.

While it will be seen that the mechanism described is admirably adapted for the sorting of records it will be readily understood that the sensing and various other mechanisms could be readily adapted for use in connection with tabulators and other card or record controlled mechanism, and the invention is, therefore, not limited to the specific embodiment in which it is shown.

What I claim is:

1. In a record-controlled machine, the combination of a plurality of sets of magnets, a record-controlled selecting means including an induction coil for effecting a high tension discharge through minute punctures in a record for automatically selecting a required set of said magnets and record-controlled selecting means including an induction coil for effecting a high tension discharge through minute punctures in a record for selecting a respective magnet of the selected set.

2. In a record-controlled machine, the combination of a plurality of sets of magnets, a record-controlled high tension circuit for automatically selecting a required set of said magnets, an auxiliary spark gap in said circuit for enforcing correct selection thereby, a record-controlled high tension circuit for selecting a required magnet of the selected set, and an auxiliary spark gap in the last said circuit for enforcing correct selection thereby.

3. In a record-controlled machine, the combination of a plurality of relays, each provided with an armature which may be moved to either of two positions and will automatically remain in the position to which it is moved, record sensing means constructed and arranged for sensing record punctures at predetermined data-indicating positions, means whereby said sensing means may effect selective operation of the armatures of said relays in one direction, and means for automatically reversing the current thru said relays to move said armatures in the opposite direction for resetting purposes.

4. In a record-controlled machine, the combination of sensing means, spark-effecting means associated with said sensing means for effecting work according to the control of said sensing means, and a manipulative member for advancing and retarding the time of the spark whereby said machine may be caused to sense according to different datum zones on the record being analyzed.

5. In a record-controlled machine, the combination of a plurality of sets of magnets, record-controlled selecting means including a record contacting member for automatically selecting a required set of said magnets, record-controlled selecting means including a plurality of record-contacting members for automatically selecting respective magnets of the selected set, the construction and arrangement being such that all of said members are in a single plane and that the distance between the first said member and said plurality of members is greater than the distance between any two adjacent members of said plurality, and means for moving both of said selecting means from one denominational position to another.

6. In a record-controlled machine, the combination with a plurality of record stations, means for effecting entry of a record into each of said stations, record sensing means including members for effecting high tension discharge through minute punctures in a record for determining the station to which such record shall be delivered, a roller movable in the direction of the axis of the roller to either of two positions one of which is effective for operating the first said means with respect to a respective station, and means automatically controlled from said sensing means for effecting movement of said roller to effective position.

7. In a record-controlled machine, a high tension circuit including elements cooperative with a pierced multi-column record for forming a plurality of spark-gaps in said circuit, and elements arranged to form an auxiliary spark-gap in said circuit whereby the distance which the sparks may jump between the first said elements may be automatically controlled according to the piercing of the record.

8. In a record-controlled machine, the combination of a plurality of relays, a plurality of sets of magnets associated therewith, all of said magnets having assigned numerical values, the values of the magnets of one set being different from those of another, record sensing means including members for effecting a high tension discharge through minute data punctures in a record, means controlled by the first said means for setting any one of a plurality of said relays to select respective magnets of each of said sets, and means controllable by the first said means for setting one of said relays for completing the circuit thru one only of the magnets selected by the relay operated.

9. A machine according to claim 8 and including automatic means for resetting the said relays.

10. In a record-controlled sorting machine, the combination of a record sensing device including members for effecting a high tension discharge through minute data punctures in a record, a plurality of record stations, a magnet at each of said stations, a record deflector at each station and operable under control of the respective magnet, a plurality of relays each operable to close the circuit for a respective plurality of said magnets, and a single relay operable for completing the circuit for any one of the magnets selected by any of said plurality of relays and under control of said record sensing device.

11. A machine according to claim 10 and including automatic means for resetting all of the relays.

12. In a record controlled machine, a high tension circuit including record sensing elements adapted to cooperate with a record having a plurality of columns with a plurality of positions in each column for sensing data indicated thereon and punctured with minute punctures to represent desired data, and including means for effecting a high tension discharge through said punctures while said sensing elements are spaced apart by said record, and including an auxiliary spark gap whereby the passage of current between the said sensing elements may be automatically controlled for preventing inter-columnar and inter-positional jumping.

13. In a record-controlled machine, analyzing means for sensing the record and thus controlling the operation of the machine, including in combination means for sensing an electric discharge only, thru positioned punctures in said record, means controlled by the discharges for translating them into controlling impulses, and means for automatically limiting the length of the electric discharge for preventing erroneous passing of the electric discharge.

ROBERT E. PARIS.